(12) United States Patent
Metke et al.

(10) Patent No.: US 8,806,205 B2
(45) Date of Patent: Aug. 12, 2014

(54) APPARATUS FOR AND METHOD OF MULTI-FACTOR AUTHENTICATION AMONG COLLABORATING COMMUNICATION DEVICES

(71) Applicant: Motorola Solutions, Inc., Schaumburg, IL (US)

(72) Inventors: Anthony R. Metke, Naperville, IL (US); Katrin Reitsma, Chicago, IL (US); Steven D. Upp, Bartlett, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/728,797

(22) Filed: Dec. 27, 2012

(65) Prior Publication Data

US 2014/0189841 A1    Jul. 3, 2014

(51) Int. Cl.
*H04L 29/06* (2006.01)
*G06F 21/00* (2013.01)
*G06F 21/40* (2013.01)
(52) U.S. Cl.
CPC ....................................... *G06F 21/40* (2013.01)
USPC .............................................. 713/168; 726/5
(58) Field of Classification Search
CPC . H04L 63/08; H04L 2463/082; H04L 63/065; H04L 63/0869; G06F 21/41; G06F 21/445
See application file for complete search history.

(56) References Cited

U.S. PATENT DOCUMENTS

| | | | |
|---|---|---|---|
| 6,421,768 B1 | 7/2002 | Purpura | |
| 6,760,758 B1 | 7/2004 | Lund et al. | |
| 6,876,643 B1 | 4/2005 | Aggarwal et al. | |
| 7,243,231 B2 | 7/2007 | Ellison et al. | |
| 7,392,387 B2 | 6/2008 | Balfanz et al. | |
| 7,716,483 B2 | 5/2010 | Sozzani et al. | |
| 7,720,438 B2 | 5/2010 | Rowse | |
| 7,788,711 B1 | 8/2010 | Sun et al. | |
| 7,925,022 B2 | 4/2011 | Jung et al. | |
| 8,041,339 B2 | 10/2011 | Teunissen et al. | |
| 8,090,945 B2 | 1/2012 | Singhal | |
| 8,141,134 B2 | 3/2012 | Brandt et al. | |

(Continued)

FOREIGN PATENT DOCUMENTS

| | | |
|---|---|---|
| CN | 1473310 A | 2/2004 |
| EP | 1802155 A1 | 6/2007 |

(Continued)

OTHER PUBLICATIONS

"BUMP (application)" accessed at wikipedia.com on Jan. 24, 2012, last modified on Jan. 17, 2013.

(Continued)

*Primary Examiner* — Izunna Okeke
(74) *Attorney, Agent, or Firm* — Steven A. May; Kenneth A. Haas

(57) ABSTRACT

Multi-factor authentication is enabled across a plurality of communication devices. A user performs authentication by using a first authentication factor on a first of the communication devices, and by using a second authentication factor on a second of the communication devices. A collaboration credential is shared among the devices to enable the devices to collaborate with each other. Both of the authentication factors are bound together. A multi-factor identification token is issued to each device, to support multi-factor authentication for the user across the devices.

16 Claims, 4 Drawing Sheets

(56) References Cited

U.S. PATENT DOCUMENTS

| | | |
|---|---|---|
| 8,161,172 B2 | 4/2012 | Reisman |
| 8,201,231 B2 | 6/2012 | Williams et al. |
| 8,205,247 B2 | 6/2012 | Lexcellent et al. |
| 8,220,035 B1 | 7/2012 | Pravetz et al. |
| 8,327,427 B2 | 12/2012 | Soukup et al. |
| 2001/0041531 A1 | 11/2001 | Haight et al. |
| 2003/0026433 A1 | 2/2003 | Matt |
| 2003/0105981 A1 | 6/2003 | Miller et al. |
| 2003/0159072 A1 | 8/2003 | Bellinger et al. |
| 2004/0097217 A1 | 5/2004 | McClain |
| 2005/0198204 A1 | 9/2005 | Takahashi |
| 2005/0221813 A1 | 10/2005 | Rajahalme et al. |
| 2005/0266826 A1 | 12/2005 | Vlad |
| 2006/0075230 A1 | 4/2006 | Baird et al. |
| 2006/0083208 A1 | 4/2006 | Lin |
| 2006/0185004 A1 | 8/2006 | Song et al. |
| 2006/0293028 A1 | 12/2006 | Gadamsetty et al. |
| 2007/0016943 A1 | 1/2007 | M'Raihi et al. |
| 2007/0019616 A1 | 1/2007 | Rantapuska et al. |
| 2007/0022301 A1 | 1/2007 | Nicholson et al. |
| 2007/0194931 A1 | 8/2007 | Miller et al. |
| 2007/0202807 A1 | 8/2007 | Kim |
| 2007/0203850 A1 | 8/2007 | Singh et al. |
| 2007/0236586 A1 | 10/2007 | Ryckman |
| 2007/0254709 A1 | 11/2007 | Higgins |
| 2007/0264976 A1 | 11/2007 | Lessing et al. |
| 2008/0052399 A1 | 2/2008 | Nguyen |
| 2008/0083708 A1 | 4/2008 | Hussary et al. |
| 2008/0120711 A1 | 5/2008 | Dispensa |
| 2008/0148350 A1 | 6/2008 | Hawkins et al. |
| 2008/0172341 A1 | 7/2008 | Crandell |
| 2008/0222711 A1 | 9/2008 | Michaelis |
| 2008/0268776 A1 | 10/2008 | Amendola |
| 2008/0278329 A1 | 11/2008 | Kim et al. |
| 2008/0320190 A1 | 12/2008 | Lydon et al. |
| 2008/0320587 A1 | 12/2008 | Vauclair et al. |
| 2009/0070472 A1 | 3/2009 | Baldus et al. |
| 2009/0083378 A1 | 3/2009 | Lingafelt et al. |
| 2009/0202079 A1 | 8/2009 | Puputti et al. |
| 2009/0217367 A1 | 8/2009 | Norman et al. |
| 2009/0249478 A1 | 10/2009 | Rosener et al. |
| 2009/0287922 A1 | 11/2009 | Herwono et al. |
| 2010/0005294 A1 | 1/2010 | Kostiainen et al. |
| 2010/0088390 A1 | 4/2010 | Bai et al. |
| 2010/0145860 A1 | 6/2010 | Pelegero |
| 2011/0028091 A1 | 2/2011 | Higgins et al. |
| 2011/0028125 A1 | 2/2011 | Dehlinger et al. |
| 2011/0030044 A1 | 2/2011 | Kranendonk et al. |
| 2011/0136470 A1 | 6/2011 | Kurz |
| 2011/0167126 A1 | 7/2011 | Yim et al. |
| 2011/0212688 A1 | 9/2011 | Griffin et al. |
| 2011/0237217 A1 | 9/2011 | Monks et al. |
| 2011/0238995 A1 | 9/2011 | Blanco et al. |
| 2011/0282960 A1 | 11/2011 | Lin |
| 2012/0072503 A1 | 3/2012 | Kowalewski |
| 2012/0077442 A1 | 3/2012 | Piazza et al. |
| 2012/0084364 A1 | 4/2012 | Sivakeesar |
| 2012/0084565 A1 | 4/2012 | Wittenberg et al. |
| 2012/0117626 A1 | 5/2012 | Yates et al. |
| 2012/0144202 A1 | 6/2012 | Counterman |
| 2012/0179789 A1 | 7/2012 | Griot et al. |
| 2012/0198531 A1 | 8/2012 | Ort et al. |
| 2012/0210413 A1 | 8/2012 | Akula et al. |
| 2012/0216267 A1 | 8/2012 | Austel et al. |
| 2012/0222102 A1* | 8/2012 | Hirose .............................. 726/7 |
| 2012/0239936 A1 | 9/2012 | Holtmanns et al. |
| 2013/0018975 A1 | 1/2013 | Higgins |
| 2013/0081126 A1 | 3/2013 | Soukup et al. |

FOREIGN PATENT DOCUMENTS

| | | |
|---|---|---|
| EP | 2068597 A1 | 6/2009 |
| EP | 2456245 A1 | 5/2012 |
| GB | 2365699 A | 2/2002 |
| GB | 2478653 A | 9/2011 |
| WO | 0221429 A2 | 3/2002 |
| WO | 2005119931 A1 | 12/2005 |
| WO | 2006027725 A1 | 3/2006 |
| WO | 2006067281 A1 | 6/2006 |
| WO | 2007107708 A2 | 9/2007 |
| WO | 2008027750 A2 | 3/2008 |
| WO | 2009044228 A2 | 4/2009 |
| WO | 2009058494 A1 | 5/2009 |
| WO | 2009066212 A1 | 5/2009 |
| WO | 2009070430 A2 | 6/2009 |
| WO | 2009095048 A1 | 8/2009 |
| WO | 2009104131 A1 | 8/2009 |
| WO | 2009133419 A1 | 11/2009 |
| WO | 2009140170 A1 | 11/2009 |
| WO | 2011062726 A1 | 5/2011 |

OTHER PUBLICATIONS

Madsen, P., "Liberty ID-WSF Multi-Device SSO Deployment Guide," Version: 1.0-02, Liberty Alliance Project, pp. 1-13.

Farrell, S. et al., "An Internet Attribute Certificate Profile for Authorization," Network Working Group, RFC 3281, pp. 1-41, Apr. 2002.

Housley, R. et al., "Internet X.509 Public Key Infrastructure Certificate and Certificate Revocation List (CRL) Profile," Network Working Group, RFC 3280, pp. 1-130, Apr. 2002.

"Otway-Rees protocol," accessed at http://en.wikipedia.org/wiki/Otway%E2%80%93Rees_protocol, accessed on Jan. 24, 2012.

"SAML V2.0 Holder-of-Key Web Browser SSO Profile Version 1.0," accessed at http://docs.oasis-open.org/security/saml/Post2.0/sstc-saml-holder-of-key-browser-sso.pdf, Aug. 10, 2010, pp. 24.

"Bradley, J. et al., "The OAuth 2.0 Authorization Framework: Holder-of-the-Key Token Usagedraft-tschofenig-oauth-hotk-01.txt," Network Working Group, Internet-Draft, pp. 23, Jul. 16, 2012".

International Search Report and Written Opinion for related counterpart International Application No. PCT/US2010/042825 mailed on Oct. 22, 2010.

Sharmila et al., "Bluetooth Man-In-The-Middle Attack Based on Secure Simple Pairing using Out of Band Association model," International Conference on Control, Automation, Communication and Energy Conservation, 2009, Jun. 4-6, 2009, IEEE, pp. 1-6.

International Preliminary Report on Patentability and Written Opinion for related counterpart International application No. PCT/US2010/042825 dated Feb. 7, 2012.

International Search Report and Written Opinion for related counterpart International Application No. PCT/US2010/061217 mailed on Jun. 27, 2011.

International Preliminary Report on Patentability and Written Opinion for related counterpart International application No. PCT/US2010/061217 dated Oct. 2, 2012.

Non Final Office Action mailed Oct. 4, 2012 in related U.S. Appl. No. 12/748,982 Alejandro G. Blanco, filed Mar. 29, 2010.

Non Final Office Action mailed Apr. 9, 2012 in related U.S. Appl. No. 12/534,246, Robert J. Higgins, filed Aug. 3, 2009.

Final Office Action mailed Sep. 13, 2012 in related U.S. Appl. No. 12/534,246, Robert J. Higgins, filed Aug. 3, 2009.

Final Office Action mailed on Apr. 24, 2013 in U.S. Appl. No. 12/748,982, Alejandro G Blanco, filed Mar. 29, 2010.

International Search Report for International Patent Application No. PCT/US2012/046014 mailed on Oct. 11, 2012.

Non Final Office Action mailed on Jun. 24, 2013 in related U.S. Appl. No. 13/183,930, Robert J Higgins, filed Jul. 15, 2011.

Tuecke, S., et al., "Internet X.509 Public Key Infrastructure (PKI) Proxy Certificate Profile," Network Working Group, RFC 3820, Jun. 2004, pp. 1-37.

Final Office Action mailed Oct. 16, 2013 in U.S. Appl. No. 13/183,930, Robert J. Higgins, filed Jul. 15, 2011.

Office Action for European Patent Application No. 10738091.7 mailed Nov. 6, 2013.

Novotny L and Hecht B., "Principles of Nano-Optics: Theoretical foundations," Cambridge University Press, Chapter 2, 2006, pp. 13-44.

Notice of Allowance mailed Dec. 23, 2013 in U.S. Appl. No. 12/748,982, Alejandro G. Blanco, filed Mar. 29, 2010.

(56) References Cited

OTHER PUBLICATIONS

"Performance of RFID Tags in Near and Far Field", Flores, etc., Personal Wireless Communications, 2005. ICPWC 2005 IEEE International Conference on, Jan. 23-25, 2005, pp. 353-357.
Assertions and Protocols for the Oasis Security Assertion Markup Language (SAML) V2.0; Oasis Standard, March 15, 2005; 86 Pages; Editors Scott Cantor, et al.
Australian Patent Examination Report No. 1 issued on Jul. 1, 2013 in Australian Patent Application No. 2010281501.
Australian Patent Examination Report No. 2 issued on Aug. 23, 2013 in Australian Patent Application No. 2010281501.
Australian Patent Examination Report No. 1 issued on Sep. 6, 2013 in Australian Patent Application No. 2010349709.
Canadian Office Action mailed on Sep. 27, 2013 in Canadian Patent Application No. 2769331.
Chinese Office Action issued on Dec. 10, 2013 in Chinese Patent Application No. 201080034505.x.
Hocking C.G., et al. "A Distributed and Cooperative User Authentication Framework", Information Assurance and Security (IAS), 2010 Sixth International Confeence on, IEEE, Aug. 23, 2010, pp. 304-310, XP031777197, ISBN:978-1-4244-7407-3.
Jeffrey Fischer. "NFC in cell phones: The new paradigm for an interactive world". Communications Magazine, IEEE, vol. 47, No. 6, pp. 22-28, Jun. 2009.
Lishoy Francis, Gerhard Hancke, Keith Mayes, and Konstantinos Markantonakis. Practical NFC Peer-to-Peer Relay Attackv Using Mobile Phones.In RFI DSec'1 0 Proceedings of the 6th international conference on Radio frequency identification:security and privacy issues. Istanbul, Turkey, Jun. 8-9, 2010. pp. 35-49.
Marc Barish "Design and Evaluation of an Architecture for Ubiquitous User Authentication Based on Identity Management Systems", Trust, Security and Privacy in Computing and Communicatiions (Trustcom), 2011 IEEE 10th International Conference on, Nov. 16, 2011, pp. 863-872, XP032086891, D01:10.1109/Trustcom.2011. 116, ISBN:978-1-4577-2135-9.
Non Final Office Action mailed on Apr. 22, 2014 in related U.S. Appl, No. 13/183,930, Robert J Higgins, filed Jul. 15, 2011.
Notice of Allowance mailed Apr. 14, 2014 in U.S. Appl. No. 12/748,982, Alejandro G Blanco, filed Mar. 29, 2010.
PCT International Search Report Dated Mar. 14, 2014 for Counterpart ApplicationPCT/US2013/071850.
Yih-chun Hu, Adrian Perrig, and David B. Johnson. "Wormhole attacks in wireless networks". In IEEE Journal on SelectedAreas in Communications vol. 24. Published 2006 pp. 370-380.
PCT International Search Report Dated Mar. 5, 2014 for Related Application PCT/US2013/071862.
US Office Action Dated Apr. 10, 2014 for Related U.S. Appl. No. 13/128,422.
Cabarcos, Patricia Arias, et al. "Multi-Device Single Sign-On for Cloud Service Continuity", Consumer Electronics (ICCE), 2012 IEEE International Conference on. 2012.
Cabarcos, Patricia Arias, et al. "SuSSO: Seamless and Ubiquitous Single Sign-On for Cloud Service Continuity Across Devices" Consumer Electronics, IEEE Transactions on 58.4, 2012, 1425-1433.
Chandershekarapuram, Appadodharana, et al. "Architecture Framework for Device Single Sign-On on Personal Area Networks" on the Move to Meaningful Internet Systems 2006: OTM 2006 Workshops. Springer Berlin Heidelberg, 2006.
Sanchez, Rosa, et al. "Enhancing Privacy and Dynamic Federation in idM for Consumer Cloud Computing" Consumer Electronics, IEEE Transactions on 58.1 (2012); 95-103.
US Office Action Dated Apr. 7, 2014 for Related U.S. Appl. No. 13/728,521.
Madsen, P. Liberty ID-WSF Multi-Device SSO Deployment Guide, 2008.
US Notice of Allowance Dated May 27, 2014 for Related U.S. Appl. No. 13/728,521.
US Notice of Allowance Dated May 21, 2014 for Related U.S. Appl. No. 13/728,422.
Chinese Office Action Dated December 10, 2013 for Related Counterpart Application CN201080034505.X, Inclusive of All References Cited.
Jlm Flores, et al. "A Performance of RFID TAGS in Near and Far Field" Personal Wireless Communications 2005; ICPWC 2005; 2005 International Conference on; pp. 353-357; Jan. 2005.
PCT International Search Report Dated Mar. 14, 2014 for Related Counterpart Application PCT/US2013/071876.
PCT International Search Report Dated March 19, 2014 for Related Counterpart Application PT/US2013/071844.

\* cited by examiner

APPARATUS FOR AND METHOD OF MULTI-FACTOR AUTHENTICATION AMONG COLLABORATING COMMUNICATION DEVICES

REFERENCE TO RELATED APPLICATIONS

The present application is related to U.S. patent application Ser. No. 13/728,598, entitled "Method of and System for Authenticating and Operating Personal Communication Devices over Public Safety Networks"; U.S. patent application Ser. No. 13/728,422, entitled "Method and Apparatus for Single Sign-On Collaboration Among Mobile Devices"; U.S. patent application Ser. No. 13/728,521, entitled "Method and Apparatus for Single Sign-On Collaboration Among Mobile Devices"; U.S. patent application Ser. No. 13/728,711, CM15568, entitled "Method and Apparatus for Ensuring Collaboration Between a Narrowband Device and a Broadband Device"; and U.S. patent application Ser. No. 13/728,752, entitled "System and Method for Scoping a User Identity Assertion to Collaborative Devices"; which applications are commonly owned and filed on the same date as this application and the contents of which applications are incorporated herein in their entirety by reference thereto.

FIELD OF THE DISCLOSURE

The present disclosure relates generally to an apparatus for, and a method of, multi-factor authentication among a plurality of collaborating communication devices.

BACKGROUND

Multi-factor authentication is an approach to security authentication, which requires that an on-line user of a network provide more than one form of verification in order to prove his or her identity and allow access to the network. Multi-factor authentication takes advantage of a combination of several factors of authentication. Three major factors include: verification by something the user knows, such as a password, or a personal identification number (PIN); something the user has, such as a smart card, a security fob, a hardware or virtual token, a USB dongle, or a digital certificate; and something the user is, such as a biometric characteristic, e.g., a fingerprint, a facial image, a retinal pattern, a voice print, etc. Due to its increased complexity, a multi-factor authentication is harder to compromise than a single factor authentication.

As advantageous as these multi-factor authentication techniques have been, multi-factor authentication is not supported when a user performs authentication by using a first authentication factor on a first communication device, and performs authentication by using a second authentication factor on a second collaborating communication device. The term "collaborating" or "collaboration" refers to a type of working cooperation among the communication devices, whereby a user can securely leverage the capabilities of a second communication device from a first communication device; for example, the user can sign-on, or login, to a first service from a first communication device, and leverage a set of enhanced identity management procedures to securely access the first service, as well as other services, from the first communication device, as well as from other communication devices, without needing to perform additional manual sign-on procedures. By way of example, a user may be checking his or her email, or using some other application hosted by a service provider, on a personal digital assistant or a smartphone, and then, for whatever reason, may subsequently wish to check his or her email, or even run a different application, e.g., banking services, shopping services, etc., on his or her laptop computer or a desktop computer. Thereafter, the user may wish to check his or her email, or even run a different application, on his or her tablet. The user may, in case of emergency, subsequently wish to run an application, on his or her land mobile radio (LMR). Security Assertion Markup Language (SAML) and Web Authorization Protocol (OAuth) are examples of open standards for exchanging authentication and authorization data between such multiple applications on a single communication device, but not across multiple devices.

However, each of these devices typically has different hardware specifications and often are accessed with different authentication factors. One device might have a real or virtual keyboard to enter a user name and password, but not a biometric scanner, or some other means of factor authentication. Another device might have a biometric scanner, but not a slot/socket for receiving a security card, a dongle, or hardware token, or some other means of factor authentication. Some devices may be configured to enter multiple factors, but the user may be unwilling to repeat a factor previously entered on another device. Some service providers require multi-factor authentication to access their services.

At present, there is no multi-factor authentication process that supports the user across a plurality of collaborating communication devices, whereby the user performs authentication by using a first authentication factor on a first device, and then performs authentication by using a second authentication factor on a second device, and whereby these authentication factors are bound together such that the network recognizes that multi-factor authentication has been performed. Accordingly, there is a need to enable multi-factor authentication across a plurality of collaborating communication devices for greater network security.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
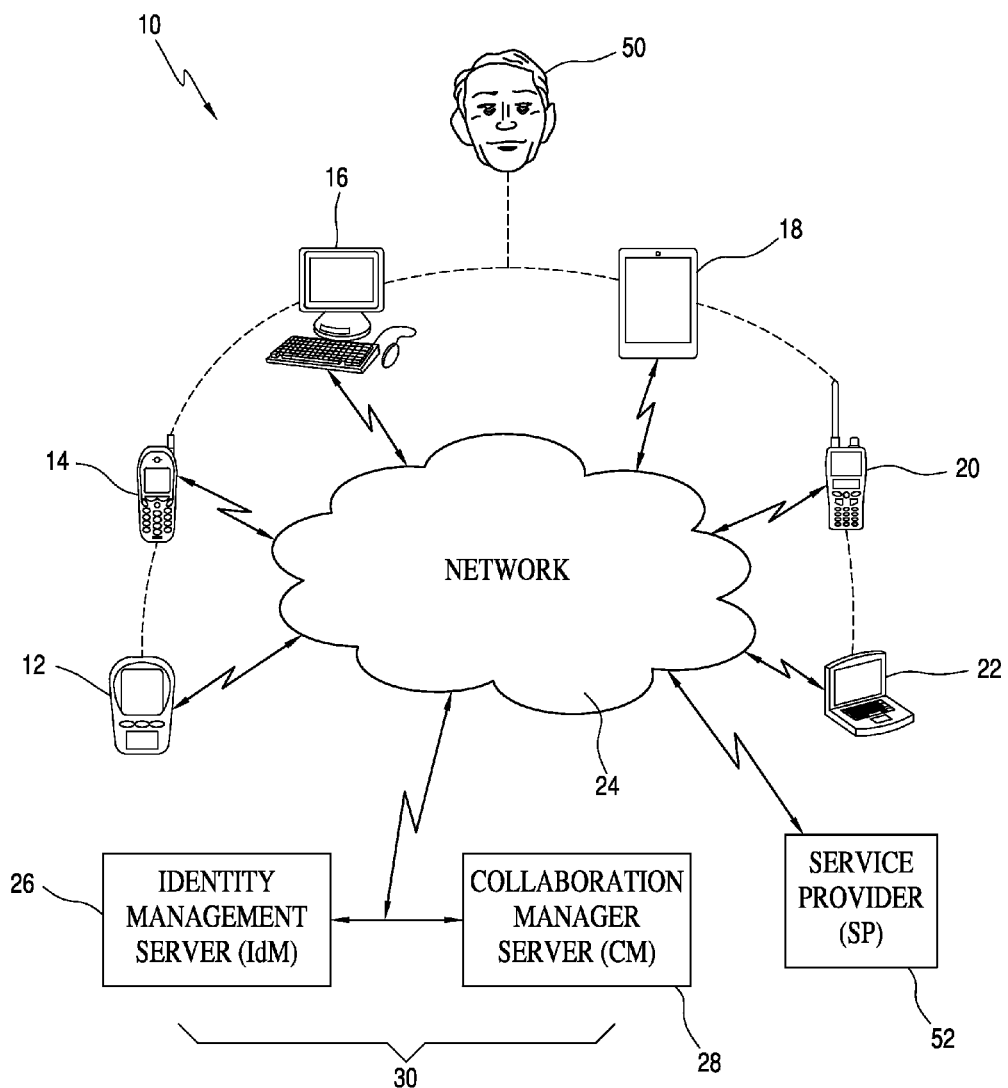
FIG. 1 is a schematic view of an apparatus for multi-factor authentication among a plurality of collaborating communication devices in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to an apparatus for multi-factor authentication among a plurality of collaborating communication devices. The apparatus includes a server operative for authenticating a user who uses a first authentication factor on a first of the communication devices, and a second authentication factor on a second of the communication devices. The server is further operative for sharing a collaboration credential (as defined below) among the communication devices to enable the communication devices to collaborate with each other. The server is still further operative for binding both of the authentication factors, and for issuing a multi-factor identification token to each to the communication devices, to support multi-factor authentication for the user across the plurality of communication devices.

Advantageously, the collaboration credential can be generated by the server or by one of the communication devices. The term "sharing" is intended to mean a transmission of the collaboration credential among the server and the devices. For example, if the server generates the collaboration credential, then the collaboration credential is shared when it is received by one of the devices, and/or when it is sent to, and received by, another of the devices. Similarly, if one of the devices generates the collaboration credential, then the collaboration credential is shared when it is received by the server or another of the devices, and/or when it is sent by the other device to the server or the one device.

A method, in accordance with another aspect of this disclosure, of multi-factor authentication among a plurality of communication devices, is performed by authenticating a user who uses a first authentication factor on a first of the communication devices, and who uses a second authentication factor on a second of the communication devices, by sharing a collaboration credential among the communication devices to enable the communication devices to collaborate with each other, by binding both of the authentication factors, and by issuing a multi-factor identification token to each of the communication devices, to support multi-factor authentication for the user across the plurality of communication devices.

Turning now to the drawings, reference numeral 10 in FIG. 1 generally identifies an apparatus for multi-factor authentication for a user 50 among a plurality of his or her communication devices, such as, by way of non-limiting example, a personal digital assistant 12, a smartphone 14, a desktop computer 16, a tablet 18, a land mobile radio (LMR) 20, and a laptop computer 22. Other communication devices, and other device types, that are different from those illustrated are also contemplated by the present disclosure. Each of these communication devices has one or more network interfaces, which may include one or more radio frequency (RF) transceivers operatively connected to a network 24, for example, the Internet, preferably over a bi-directional wireless link, such as Wi-Fi, which is an open wireless standard for transmission of digital voice and data. The network 24 need not be a single network as illustrated, but could comprise a plurality of networks interconnected by forwarding equipment. The communication devices 12, 14, 16, 18, 20 and 22 not only communicate over the network 24 with a service provider (SP) 52, but can also wirelessly communicate with one another, for example, via Bluetooth®, which is another open wireless standard for transmission of digital voice and data between devices.

In one embodiment, all of the user's communication devices 12, 14, 16, 18, 20 and 22 can communicate directly with each other. In another embodiment, some of the user's communication devices may have to communicate with each other via one or more of the user's other communication devices. In one embodiment, all of the user's communication devices have the same wireless interface, such as Bluetooth®. In another embodiment, some of the user's communication devices have one wireless interface, such as Bluetooth®; others of the communication devices have another wireless interface, such as Wi-Fi; and still others of the communication devices have both, or other interfaces.

The apparatus 10 includes a server 30, which comprises either a single identity management server (IdM) 26, or the IdM 26 in combination with a collaboration manager server (CM) 28. The server 30 is operatively connected to the network 24 over a bi-directional wireline or wireless link and interacts with one or more of the devices 12, 14, 16, 18, 20 and 22, as described in detail below. Each server comprises one or more processes running on one or more computers. More particularly, each of the server 30 and the mobile devices 12, 14, 16, 18, 20 and 22 includes a processor, such as one or more microprocessors, microcontrollers, digital signal processors (DSPs), combinations thereof or such other devices known to those having ordinary skill in the art. The particular operations/functions of the processor, and respectively thus of the server and communication devices, is determined by an execution of software instructions and routines that are stored in a respective at least one memory device associated with the processor, such as random access memory (RAM), dynamic random access memory (DRAM), and/or read only memory (ROM) or equivalents thereof, that store data and programs that may be executed by the corresponding processor. Further, in the event that the server 30 is implement as both the IdM 26 and the CM 28, each of the IdM and the CM includes a processor whose particular operations/functions, and respectively thus of the server, is determined by an execution of software instructions and routines that are stored in a respective at least one memory device associated with the processor. Unless otherwise specified herein, the functionality described herein as being performed by the server(s) and mobile devices is implemented with or in software programs and instructions stored in the respective at least one memory device of the server(s) and mobile devices and executed by the associated processor of the server(s) and mobile devices.

As noted above, each of these devices 12, 14, 16, 18, 20 and 22 typically has different hardware specifications and often are accessed with different authentication factors. For example, the laptop computer 22 has a real keyboard to enter a user name and password, but may not have a biometric scanner, or some other means of factor authentication. The tablet 18 might have a biometric scanner, but not a slot/socket for receiving a security card, a dongle, or hardware token, or some other means of factor authentication. The desktop computer 16 may be the only device configured to enter multiple factors, but the user 50 may be unwilling to repeat a factor previously entered on another device. Some SPs 52 require multi-factor authentication to access their services.

Turning now to the message sequence charts of FIGS. 2-4, across the top of each chart, any one of the aforementioned devices 12, 14, 16, 18, 20 and 22 is depicted, and hereinafter referred to, as device 1, and any other of the aforementioned devices 12, 14, 16, 18, 20 and 22 is depicted, and hereinafter referred to, as device 2. It will be appreciated that the devices 1 and 2 may be of different types, or may be of the same type, e.g., both devices 1 and 2 may be smartphones. Also shown, across the top of each chart, are the IdM 26 and the SP 52, e.g., a host for hosting services and applications that are provided over the network 24. The timed sequence in which various actions are performed is shown as one proceeds down away from the top of the chart.

Figure 2:
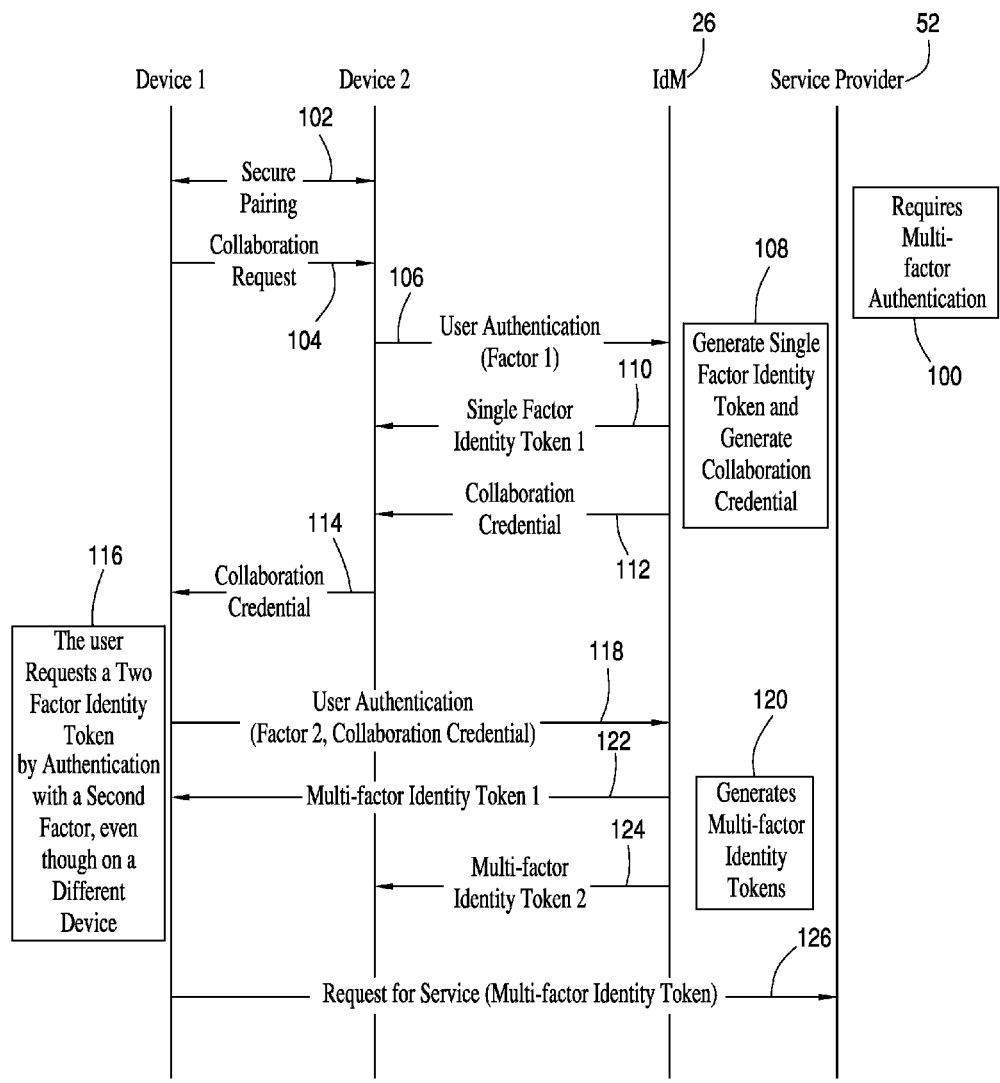
FIG. 2 is a message sequence chart depicting steps performed in a method of multi-factor authentication among a plurality of collaborating communication devices in accordance with one embodiment of the present disclosure.

In FIG. 2, the SP 52 requires multi-factor authentication (box 100) to access its services. As shown, the user 50 of the device 1 first establishes a secure connection or "pairing" with the device (see message 102). If Bluetooth® is employed, then pairing occurs when two Bluetooth® devices agree to communicate with each other and establish the secure connection. In some cases, Bluetooth® can provide the needed security association, and, in other cases, a higher communication layer can provide the needed security association. In some cases, a shared secret, also sometimes referred to as a passkey or a personal identification number (PIN), is exchanged between the two devices 1 and 2. Alternatively, the devices 1 and 2 can each derive a shared secret without directly exchanging the value of the shared secret between each other, such as is provided by the well known Diffie-Hellman algorithm. A passkey is a code shared by both devices 1 and 2, which proves that both devices have agreed to pair with each other.

It will be appreciated by those skilled in the art that once a security association exists between devices, data can be sent securely between the devices 1 and 2 using the security association. In one embodiment, the security association used for pairing is established through the use of certificate-based authentication. Where the paired devices exchange digital certificates, such as standard X.509 certificates, public key cryptographic methods, such as those described by the TLS standard, are used to establish the necessary security association.

Once paired, the device 1 sends a collaboration request (box 104) to device 2. Then, the user of device 2, for example, authenticates himself or herself to the IdM 26 by using a first authentication factor 1 (box 106). In response, the IdM 26 generates (see box 108) a single factor identity token (as defined below) and a collaboration credential (as also defined below), and then sends the single factor identity token to the device 2 (see message 110), and also sends the collaboration credential to the device 2 (see message 112). Messages 110 and 112 need not be separate independent transmissions, but could be sent simultaneously in a single transmission. The collaboration credential is then sent by the device 2 to the device 1 (message 114), which initially requested collaboration in message 104. In this way, the collaboration credential is shared by the IdM 26 and the devices 1 and 2.

In one embodiment, the collaboration credential is a Kerberos data structure or ticket containing, by way of non-limiting example, one or more of a user identification, a session identification, a collaboration device identification(s), other collaboration device description(s), an expiration time, and other usage constraints. In another embodiment, the collaboration credential is an OAuth token, a SAML token, a JSON Web Token (JWT), or another type of identity token. The collaboration credential is a data structure that contains information used to bind multiple devices to a single user 50, or to bind multiple devices to a single purpose, or to bind the user 50 to a device, or to bind a device to one or more other devices, or to bind at least one device to a user group.

As such, the collaboration credential may contain a user identification, and one or more device identifications. The collaboration credential can include constraints indicating under what circumstances collaboration can occur, such as requirements on devices with which collaboration can occur, and identifying when collaboration can occur. Further, the collaboration credential can also contain an indication of how user authentication was performed on the device to which the collaboration credential is being issued, including an indication of the type of authentication factor used, or an indication or identification of the single factor identity token issued as a result of the user authentication, or a session identification associated with the user authentication. Because constraints may be included in the collaboration credential, each device 1 and 2 now knows which of the plurality of communication devices are permitted to collaborate with them, and also knows the conditions under which such collaboration is permitted to be conducted.

By way of non-limiting example, the device 1 might be instructed by the collaboration credential to collaborate with only one other device, such as the user's desktop computer 16, or to only collaborate with another device for a set period of time, or to only collaborate using certain applications hosted by the SP 52, or to collaborate only with communication devices with which it is able to perform certificate-based authentication, etc. The data contained in the collaboration credential may have been supplied by the user 50, or by the device 1, during identification/authentication as described above, or may have been entered into a database of the server 30 beforehand. In one embodiment, the data provided by the user 50 may be used in conjunction with data in the aforementioned database to determine the conditions under which collaboration is permitted.

Next, the user 50 of the device 1 may now request a multi-factor identity token 1 in order to access a service from the SP 52. Even though the user 50 is on a different device, i.e., device 1, the user 50 of the device 1 may use a different second authentication factor 2 to perform user authentication. Hence, the user of device 1 now authenticates himself or herself to the IdM 26 by using the second authentication factor 2 and forwards the collaboration credential to the IdM 26(message 118). Although message 118 is shown as a single transmission, it could be equivalently accomplished with a sequence of transmissions between the IdM 26 and the device 1. In response, the IdM 26 determines from the collaboration credential that this is the same user 50 who has previously authenticated himself or herself with the message(s) 118 by using a separate authentication factor, and generates (see box 120) multi-factor identity tokens (as defined below). More particularly, the IdM 26 sends a first multi-factor identity token 1 to the device 1 (see message 122), and also sends a second multi-factor identity token 2 to the device 2 (see message 124). Now, the user 50 of the device 1 can request access to the SP 52 by using the multi-factor identity token 1 (see message 126).

As described in FIG. 2, the devices 1 and 2 are paired with each other before the single factor identity token 1 is generated and sent to its respective device. FIG. 3 describes a variant architecture in which, among other things, the single factor identity token 1 is generated and sent to its respective device 1 before the devices 1 and 2 are paired.

Figure 3:
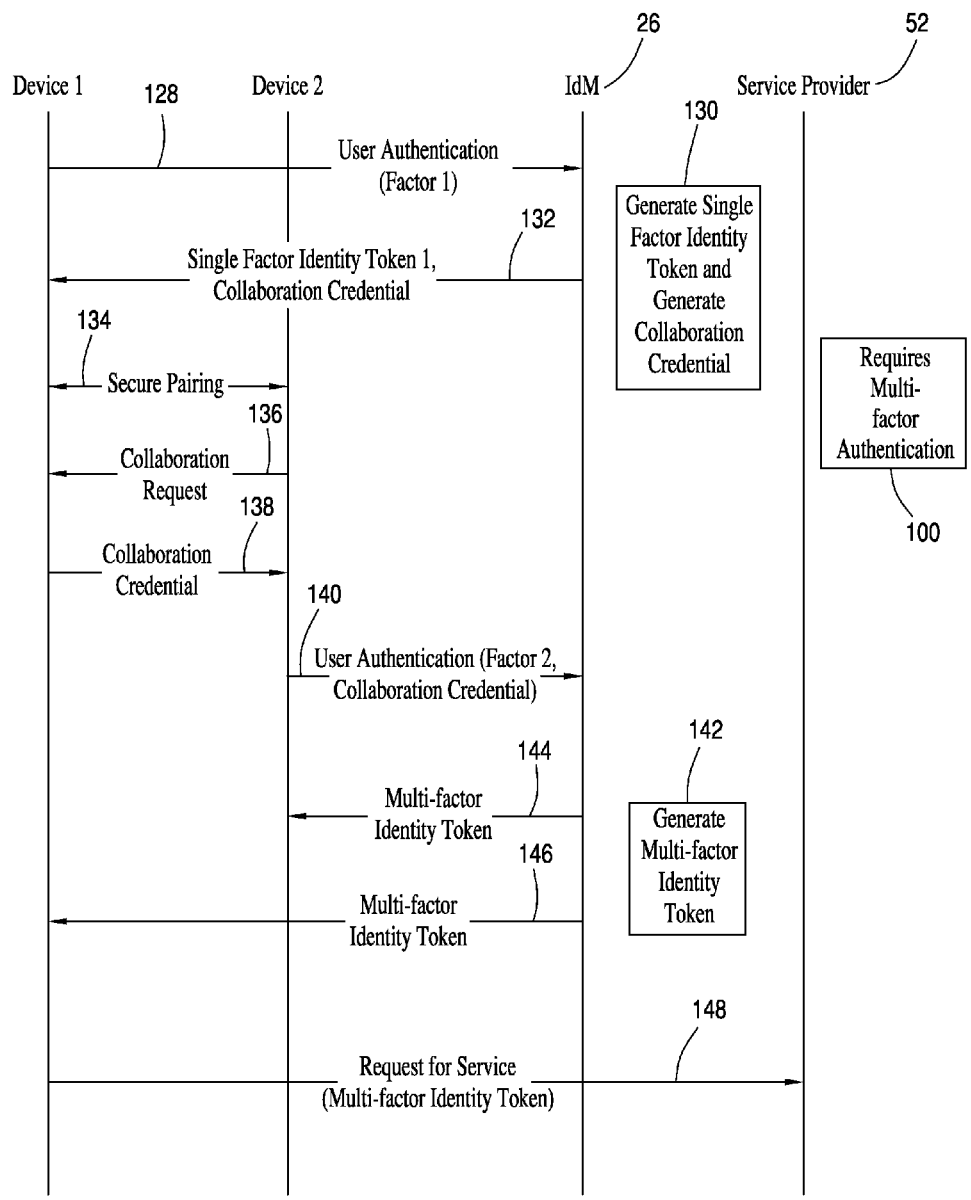
FIG. 3 is a message sequence chart depicting steps performed in a method of multi-factor authentication among a plurality of collaborating communication devices in accordance with another embodiment of the present disclosure.

In FIG. 3, as before, the SP 52 requires multi-factor authentication (box 100) to access its services. First, the user 50 of device 1, for example, authenticates himself or herself to the IdM 26 by using a first authentication factor 1 (box 128). In response, the IdM 26 generates (see box 130) a single factor identity token (as defined below) and a collaboration credential (as also defined below), and then sends the single factor identity token 1 and the collaboration credential to the device 1 (see message 132) in a single transmission, although, as noted above, these could be separate independent transmissions.

Next, the devices 1 and 2 are paired (see message 134), as described above. Either device 1 or 2 may implicitly or explicitly request a collaboration credential (as defined below) with the other (message 136), whereupon the collaboration credential is transferred between the devices 1 and 2 (message 138). Next, the user 50 of the device 2 now authenticates himself or herself to the IdM 26 by using a second authentication factor 2 and the collaboration credential is forwarded to the IdM 26 (message 140). Message 140 can be one or more transmissions. In response, the IdM 26 generates (box 142) a multi-factor identity token (as defined below), and then sends the multi-factor identity token to the device 2 (message 144), and also sends the same multi-factor identity token to the device 1 (see message 146). Now, the user 50 of either device 1 or 2 can request access to the SP 52 using the multi-factor identity token (message 148).

Figure 4:
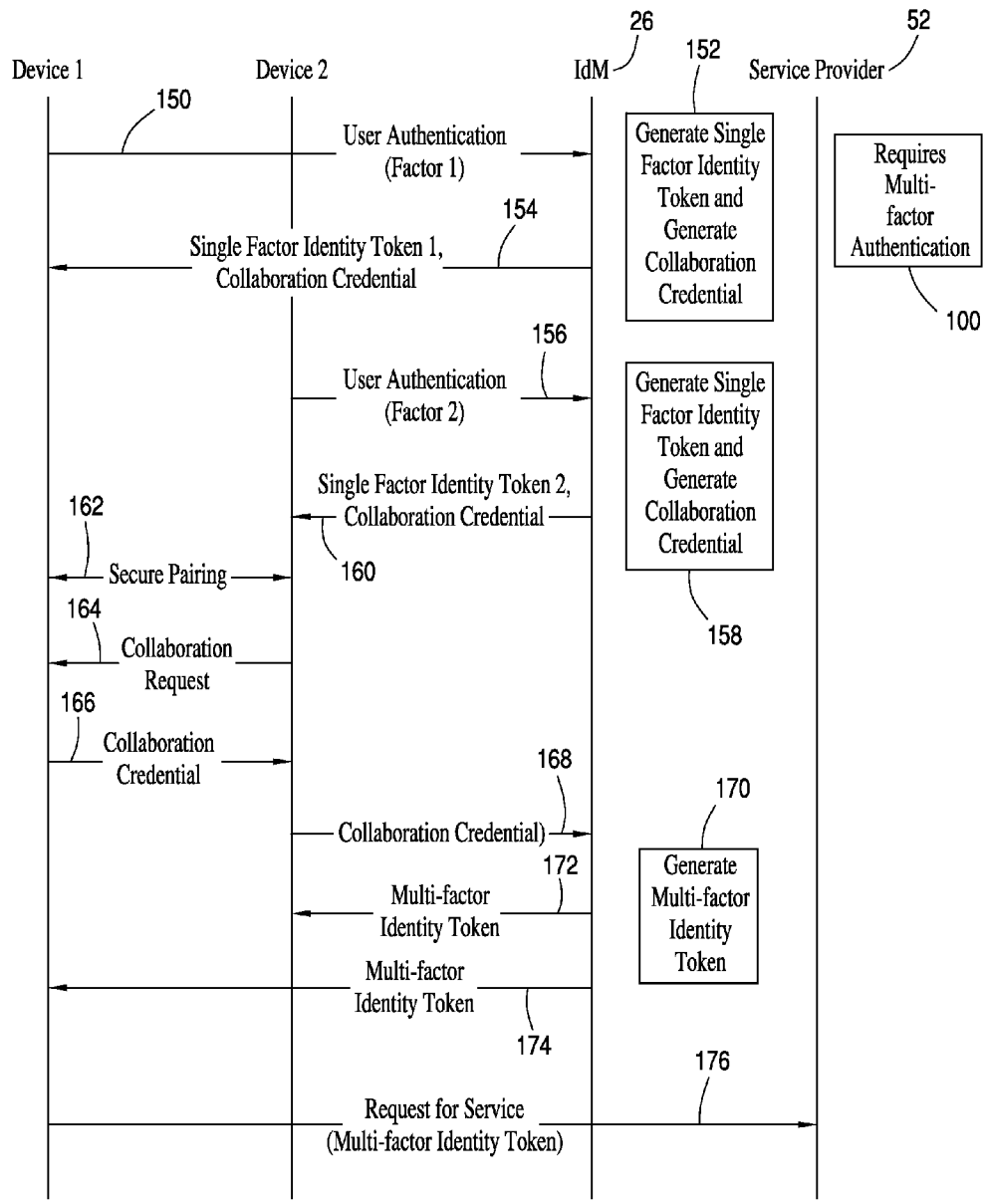
FIG. 4 is a message sequence chart depicting steps performed in a method of multi-factor authentication among a plurality of collaborating communication devices in accordance with another embodiment of the present disclosure.

FIG. 4 describes a variant architecture in which, among other things, the single factor identity tokens 1 and 2 are both initially generated and sent to the respective devices 1 and 2, after which the devices 1 and 2 are paired. In FIG. 4, as before, the SP 52 requires multi-factor authentication (box 100) to access its services.

First, the user 50 of device 1, for example, authenticates himself or herself to the IdM 26 by using a first authentication factor 1 (box 150). In response, the IdM 26 generates (see box 152) a single factor identity token 1 (as defined below) and a collaboration credential (as also defined below), and then sends the single factor identity token 1 and the collaboration credential to the device 1 (see message 154) in a single transmission, although, as noted above, these could be separate independent transmissions.

Next, the user 50 of the device 2 now authenticates himself or herself to the IdM 26 by using a second authentication factor 2 (message 156). At this point, the IdM 26 does not know if the user intended to perform multi-factor authentication. Hence, the IdM 26 generates (see box 158) another single factor identity token 2 (as defined below) and another collaboration credential (as also defined below), and then sends the single factor identity token 2 and the collaboration credential to the device 2 (see message 160) in a single transmission, although, as noted above, these could be separate independent transmissions.

Next, the devices are paired (see message 162), as described above. Either device 1 or 2 may implicitly or explicitly request a collaboration credential (as defined below) with the other (message 164), whereupon the collaboration credential is transferred between the devices 1 and 2 (message 166), and then to the IdM 26 (message 168). In a variant of this embodiment, the message 168 may contain at least one of the single factor identity token 2 issued to the device 2, the collaboration credential issued to the device 1, the collaboration credential issued to the device 2, or a reference to any combination of these tokens/credentials.

In response, the IdM 26 now knows that multi-factor authentication is being requested and then generates (box 170) a multi-factor identity token (as defined below), and then sends the multi-factor identity token to the device 2 (message 172), and also sends the same multi-factor identity token to the device 1 (see message 174). Now, the user 50 of either device 1 or 2 can request access to the SP 52 using the multi-factor identity token (message 176).

As described so far, the collaboration credential is the same for all the devices. It is also contemplated that different collaboration credentials could be used for different sets of the devices. For example, one collaboration credential can be used by the device 1 to enable single sign-on (SSO) collaboration with other devices, and a separate collaboration credential can be used by device 2 to collaborate with other devices. Alternatively, one collaboration credential may be constrained to a specific application, a set of applications, a device type, a device assurance level, a collaborative network type (personal area network, vehicular area network, etc.), or to any other device, user, or network attribute. The collaboration credential may contain a data field in which one, or more, or all, of the multiple authentication factors are identified although this is not necessary if the collaboration credential contained an indication of the first single factor identity token, because the IdM 26 could use that information to look up the first single factor identity token and determine the authentication factor that was used.

Throughout this specification, the term "identity token" is used to refer to a syntactical structure that communicates information about the user 50. Types of information often communicated within an identity token include: a unique identifier for the user 50, a unique identifier of the server 30 which issued the identity token, an expiration time after which the identity token may no longer be used, the time at which the identity token was issued, and a primary authentication context reference specifying the time at which the user authenticated themselves in order to obtain the identity token and the method of authentication they used (passwords and RSA passcodes are two examples).

Identity tokens may also contain other relevant attributes about the user 50, such as his or her agency of employment, roles within his or her agency, special skills, or identifying facial attributes. This list is meant to be exemplary of a typical identity token, and non-binding, as many other attributes might be included as well. Identity tokens may be either digitally signed by the token issuer, or may alternatively require a secure connection between the consumer of the identity token (often referred to as the relying party, service provider, or resource server) and the identity token issuer.

Identity tokens are also known by other names within industry and standards. In the SAML 2.0 protocol, identity tokens may be referred to as SAML assertions, or simply, identity assertions. In OAuth, identity tokens are referred to as access tokens, and in OpenID Connect, identity tokens may be referred to as id_tokens. Other identity tokens are intended for usage strictly between the user and the token issuing server, and these are often referred to as session tokens. In OAuth, a refresh token could be thought of as but one example of a session token.

In the foregoing specification, specific embodiments have been described. However, one of ordinary skill in the art appreciates that various modifications and changes can be made without departing from the scope of the invention as set forth in the claims below. For example, although the TLS protocol has been described and illustrated herein, other cryptographic protocols, such as Internet Protocol Security (IPsec), Secure Sockets Layer (SSL), Secure Shell (SSH), and like cryptographic protocols that provide communication security over the Internet, could be employed. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for multi-factor authentication among a plurality of communication devices, comprising:
   a server having a processor that is configured to:
   authenticate a user who uses a first authentication factor on a first of the communication devices, and who uses a second authentication factor on a second of the communication devices;
   transmit a collaboration credential and a single factor identity token to the first communication device to enable the communication devices to collaborate with each other, wherein the collaboration credential gives permission for the first and second devices to share services among devices,
   receive the collaboration credential from the second of the communication devices along with a second authentication factor; and
   bind both of the authentication factors, and issue a multi-factor identification token to each of the communication devices, to support multi-factor authentication for the user across the plurality of communication devices to request access to a service.

2. The apparatus of claim 1, wherein one of the server and one of the communication devices is operative for generating the collaboration credential.

3. The apparatus of claim 1, wherein the processor is configured to send the multi-factor identification token to each of the communication devices after the collaboration credential has been shared by the communication devices.

4. The apparatus of claim 3, wherein the multi-factor identification token issued to each of the communication devices is the same.

5. The apparatus of claim 3, wherein the multi-factor identification token issued to each of the communication devices is different.

6. The apparatus of claim 1, wherein the processor is configured to issue and send a single factor identity token to one of the communication devices.

7. The apparatus of claim 1, wherein the processor is configured to issue and send single factor identity tokens to each of the communication devices.

8. The apparatus of claim 1, wherein the processor is configured to configure the collaboration credential as a data structure comprising at least one of an identification of the user, an identification of the first communication device, an identification of which of the plurality of other communication devices are permitted to collaborate with the first communication device, an identification of the conditions under which the collaboration is permitted to be conducted, and an identification of the authentication factors.

9. A method of multi-factor authentication among a plurality of communication devices, comprising:

authenticating a user who uses a first authentication factor on a first of the communication devices, and who uses a second authentication factor on a second of the communication devices, transmitting a collaboration credential and a single factor identity token to the first communication device to enable the communication devices to collaborate with each other, wherein the collaboration credential gives permission for the first and the second devices to share services among devices, receiving the collaboration credential from the second of the communication devices along with a second authentication factor binding both of the authentication factors, and issuing a multi-factor identification token to each of the communication devices, to support multi-factor authentication for the user across the plurality of communication devices to request access to a service.

10. The method of claim 9, further comprising the step of generating the collaboration credential with one of the server and one of the communication devices.

11. The method of claim 9, further comprising the step of sending the multi-factor identification token to each of the communication devices after the collaboration credential has been shared by the communication devices.

12. The method of claim 11, further comprising the step of sending the same multi-factor identification token to each of the communication devices.

13. The method of claim 11, further comprising the step of sending different multi-factor identification tokens to each of the communication devices.

14. The method of claim 11, further comprising the step of issuing and sending a single factor identity token to one of the communication devices.

15. The method of claim 11, further comprising the step of issuing and sending single factor identity tokens to each of the communication devices.

16. The method of claim 9, further comprising the step of configuring the collaboration credential as a data structure comprising at least one of an identification of the user, an identification of the first communication device, an identification of which of the plurality of other communication devices are permitted to collaborate with the first communication device, an identification of the conditions under which the collaboration is permitted to be conducted, and an identification of the authentication factors.

* * * * *